United States Patent
Chang et al.

(10) Patent No.: US 12,305,775 B1
(45) Date of Patent: May 20, 2025

(54) METHOD AND APPARATUS FOR CONTROLLING REDUNDANCY OF VALVE CONTROL SYSTEM OF CONVERTER VALVE

(71) Applicants: XI'AN XD POWER SYSTEMS CO., LTD., Xi'an (CN); CHINA XD ELECTRIC CO., LTD., Xi'an (CN)

(72) Inventors: Liguo Chang, Xi'an (CN); Yantao Lou, Xi'an (CN); Xiaogang Tu, Xi'an (CN); Hengyu Zhang, Xi'an (CN); Xiaoting Ma, Xi'an (CN); Hongchang Tian, Xi'an (CN); Jun Hong, Xi'an (CN); Yu Wang, Xi'an (CN)

(73) Assignees: XI'AN XD POWER SYSTEMS CO., LTD., Xi'an (CN); CHINA XD ELECTRIC CO., LTD., Xi'an (CN)

( * ) Notice: Subject to any disclaimer, the term of this patent is extended or adjusted under 35 U.S.C. 154(b) by 0 days.

(21) Appl. No.: 18/979,325

(22) Filed: Dec. 12, 2024

(30) Foreign Application Priority Data

Jan. 24, 2024 (CN) .......................... 202410095899.3

(51) Int. Cl.
F16K 37/00 (2006.01)
(52) U.S. Cl.
CPC ................ *F16K 37/0058* (2013.01)

(58) Field of Classification Search
CPC .................................................. F16K 37/0058
See application file for complete search history.

(56) References Cited

U.S. PATENT DOCUMENTS

2022/0196720 A1* 6/2022 He .......................... G06N 3/045
2024/0421612 A1* 12/2024 Li .......................... H02J 7/0048

FOREIGN PATENT DOCUMENTS

| CN | 111181190 A | 5/2020 |
| CN | 114079287 A | 2/2022 |
| CN | 117277395 A | 12/2023 |

\* cited by examiner

*Primary Examiner* — Rafael O De Leon Domenech
(74) *Attorney, Agent, or Firm* — George D. Morgan

(57) ABSTRACT

The present disclosure discloses a method and apparatus for controlling redundancy of a valve control system of a converter valve. The method includes: for each FPGA: in a case that the FPGA receives the on-duty state representing the active state: outputting a high-level control signal to a data selector through the FPGA; in a case that the FPGA receives the on-duty state representing the standby state: outputting a low-level control signal to the data selector through the FPGA, and maintaining a control signal output state of the FPGA and the other FPGA; and in a case that running state information of the other FPGA received by the FPGA through a monitoring output channel is a crash state: outputting a low-level signal to a control port of the other FPGA through the monitoring output channel by the FPGA.

10 Claims, 10 Drawing Sheets

METHOD AND APPARATUS FOR CONTROLLING REDUNDANCY OF VALVE CONTROL SYSTEM OF CONVERTER VALVE

CROSS-REFERENCE TO RELATED APPLICATIONS

The application claims priority to Chinese patent application No. 2024100958993, filed on Jan. 24, 2024, the entire contents of which are incorporated herein by reference.

TECHNICAL FIELD

The present disclosure relates to the technical field of flexible high voltage direct current transmission, in particular to a method and apparatus for controlling redundancy of a valve control system of a converter valve.

BACKGROUND

This part is intended to provide the background or context for embodiments of the present disclosure described in the claims. The description here is included in this part but not necessarily recognized as the prior art.

With deep development of a VSC-HVDC (Voltage Source Converter based High Voltage Direct Current Transmission) flexible direct current technology, the requirement for reliability of flexible direct current control and protection is higher and higher. A valve control system serves as "brain' of control over safe and stable running of a flexible direct current converter valve, so its full redundancy design is an effective means for improving flexible direct current reliability. At present, a full redundancy design of valve control, as shown in FIG. 1, may be summarized as: two valve control main machines which are independent of each other and mutually redundant, a pulse distribution case provided with independent switch boards (corresponding to the two valve control main machines) and a pulse distribution board, in the pulse distribution case, provided with two FPGA chips (each FPGA chip is provided with an independent power supply, an independent crystal oscillator, and an independent communication bus). Currently, what has no full redundancy in valve control is merely an optical module that interfaces with a module, but this issue has been solved through a module cross communication. Though a valve control hardware redundancy design has been an embryo, how to ensure reliability and rapidity of redundancy switching through a combination of software and hardware is also an important issue.

At the present stage, control over redundancy of the valve control system of the converter valve is usually performed through the following solution: a data selection module is controlled to switch based on the valve control pulse distribution board of the dual FPGA redundancy design by using an FPGA1.

However, the above solution has the following drawbacks at present: controlling the data selection module to switch by using the FPGA1 is not reliable, the optical module may be controlled by an FPGA2 to send a trigger pulse when the FPGA1 has a power loss, but when the FPGA1 crashes and a pin from the FPGA1 to the data selection module maintains a high-level output, the FPGA2 cannot control the optical module to send the trigger pulse.

SUMMARY

An embodiment of the present disclosure provides a method for controlling redundancy of a valve control system of a converter valve, applied to a valve control pulse distribution case in the valve control system of the converter valve. The valve control pulse distribution case includes two switch boards and pulse distribution boards connected to the two switch boards. Each pulse distribution board includes an FPGA and an optical module connected correspondingly with each switch board so as to implement efficient control over redundancy of the valve control system of the converter valve, improve valve control switching reliability and fault response speed, and enhance system running stability. The method includes:

sending an on-duty state and a trigger pulse sent by a valve control main machine and received by the two switch boards to the corresponding FPGAs in the pulse distribution boards; wherein the on-duty state includes an active state and a standby state; a monitoring output channel is arranged between the FPGAs; and the monitoring output channel is configured to transmit running state information of the FPGAS;

for each FPGA:

in a case that the FPGA receives the on-duty state representing the active state: outputting a high-level control signal to a data selector through the FPGA; and controlling an optical emitting module through the FPGA to output a trigger pulse received by the FPGA;

in a case that the FPGA receives the on-duty state representing the standby state: outputting a low-level control signal to the data selector through the FPGA, and maintaining a control signal output state of the FPGA and the other FPGA; the control signal output state is used for representing a type of a control signal outputted by the FPGA; and sending warning information that the FPGA on-duty state is abnormal and control over the optical emitting module is ineffective in a case that the other FPGA also receives the on-duty state representing the standby state; and in a case that running state information of the other FPGA received by the FPGA through the monitoring output channel is a crash state: outputting a low-level signal to a control port of the other FPGA through the monitoring output channel by the FPGA.

An embodiment of the present disclosure further provides an apparatus for controlling redundancy of a valve control system of a converter valve, applied to a valve control pulse distribution case in the valve control system of the converter valve. The valve control pulse distribution case includes two switch boards and pulse distribution boards connected to the two switch boards. Each pulse distribution board includes an FPGA and an optical module connected correspondingly with each switch board so as to implement efficient control over redundancy of the valve control system of the converter valve, improve valve control switching reliability and fault response speed, and enhance system running stability. The apparatus includes:

an information sending module, configured to send an on-duty state and a trigger pulse sent by a valve control main machine and received by the two switch boards to the corresponding FPGAs in the pulse distribution boards; wherein the on-duty state includes an active state and a standby state; a monitoring output channel is arranged between the FPGAs; and the monitoring output channel is configured to transmit running state information of the FPGAs; and an FPGA controlling module, configured to, for each FPGA:

in a case that the FPGA receives the on-duty state representing the active state: output a high-level control signal to a data selector through the FPGA; and control an optical emitting module through the FPGA to output a trigger pulse received by the FPGA;

in a case that the FPGA receives the on-duty state representing the standby state: output a low-level control signal to the data selector through the FPGA, and maintain a control signal output state of the FPGA and the other FPGA; wherein the control signal output state is used for representing a type of a control signal outputted by the FPGA; and send warning information that the FPGA on-duty state is abnormal and control over the optical emitting module is ineffective in a case that the other FPGA also receives the on-duty state representing the standby state; and in a case that running state information of the other FPGA received by the FPGA through the monitoring output channel is a crash state: output a low-level signal to a control port of the other FPGA through the monitoring output channel by the FPGA.

An embodiment of the present disclosure further provides a computer device, including a memory, a processor and a computer program stored on the memory and capable of running on the processor, wherein the processor, when performing the computer program, implements the above method for controlling redundancy of the valve control system of the converter valve.

An embodiment of the present disclosure further provides a computer-readable storage medium, storing a computer program, wherein the computer program, when performed by a processor, implements the above method for controlling redundancy of the valve control system of the converter valve.

An embodiment of the present disclosure further provides a computer program product, including a computer program, wherein the computer program, when performed by a processor, implements the above method for controlling redundancy of the valve control system of the converter valve.

In the embodiments of the present disclosure, the on-duty state and the trigger pulse sent by the valve control main machine and received by the two switch boards are sent to the corresponding FPGAs in the pulse distribution boards; wherein the on-duty state includes the active state and the standby state; the monitoring output channel is arranged between the FPGAs; and the monitoring output channel is configured to transmit the running state information of the FPGAs; for each FPGA: in a case that the FPGA receives the on-duty state representing the active state: the high-level control signal is outputted to the data selector through the FPGA; and the optical emitting module is controlled through the FPGA to output the trigger pulse received by the FPGA; in a case that the FPGA receives the on-duty state representing the standby state: the low-level control signal is outputted to the data selector through the FPGA, and the control signal output state of the FPGA and the other FPGA is maintained; the control signal output state is used for representing the type of the control signal outputted by the FPGA; and warning information that the FPGA on-duty state is abnormal and control over the optical emitting module is ineffective is sent in a case that the other FPGA also receives the on-duty state representing the standby state; and in a case that the running state information of the other FPGA received by the FPGA through the monitoring output channel is a crash state: the low-level signal is outputted to the control port of the other FPGA through the monitoring output channel by the FPGA, thus by arranging the monitoring output channel between the dual FPGAs of the pulse distribution boards of the pulse distribution case, not only is the effect of monitoring the control signal is achieved, but also the other FPGA is pulled down when the other FPGA is in a crash state so that the current FPGA outputs the low-level signal, the problem that dual FPGAs of a valve control pulse distribution board in the prior art cannot effectively control the optical emitting module is solved, efficient control over redundancy of the valve control system of the converter valve is implemented, the valve control switching reliability and fault response speed are improved, the system running stability is enhanced, and the problem of unnecessary system halt is avoided.

BRIEF DESCRIPTION OF DRAWINGS

In order to more clearly describe technical solutions in embodiments of the present disclosure or in the prior art, the accompanying drawings needed by the description in the embodiments or in the prior art will be briefly introduced below. Apparently, the accompanying drawings in the following description are only some embodiments of the present disclosure. Those ordinarily skilled in the art may also obtain other accompanying drawings according to these accompanying drawings without making creative work. In the accompanying drawings.

DETAILED DESCRIPTION OF THE EMBODIMENTS

Figure 1:
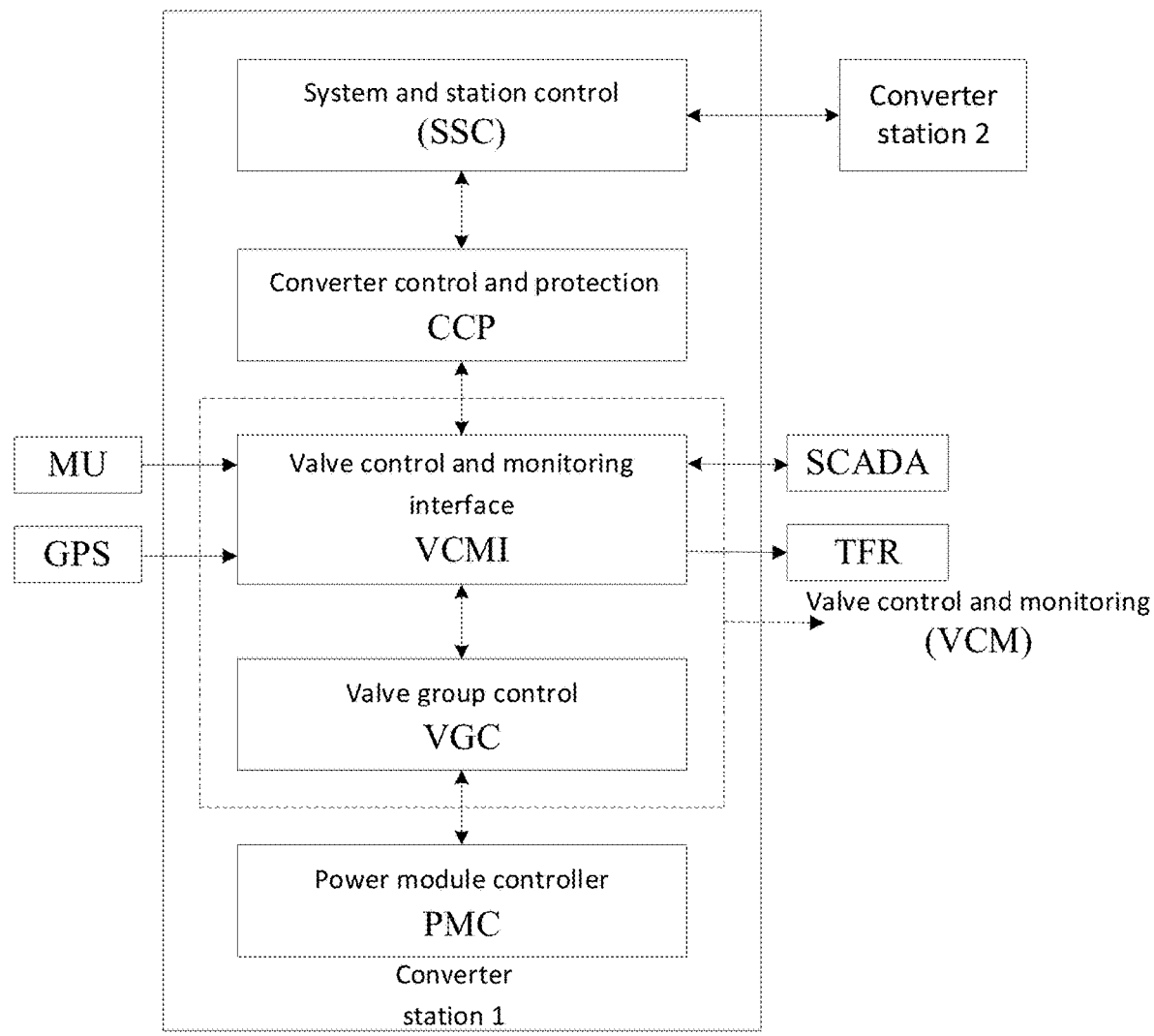
FIG. 1 is a specific example diagram of a hierarchical architecture of a flexible direct current control and protection system in an embodiment of the present disclosure.

To make the objectives, technical solutions, and advantages of the embodiments of the present disclosure clearer, the following further describes the embodiments of the present disclosure in detail with reference to the accompanying drawings. Here, exemplary embodiments of the present disclosure and their descriptions are intended to explain the present disclosure instead of limiting the present disclosure.

A term "and/or" herein only describes an association relationship and represents that there may be three relationships, for example, A and/or B, which represents that merely A exists, both A and B exist, and merely B exists. Besides, a term "at least one" herein represents any one of a plurality of types or any combination of at least two of the plurality of types, for example, including at least one of A, B or C may represent including any one or more elements selected from a set composed of A, B and C.

"Include", "comprise", "have", "contain", etc. used in the description of the present specification are all open terms and are intended to include but not limited to . . . . The description with reference to terms such as "an embodiment", "one specific embodiment", "some embodiments", and "for example" means that a specific feature, structure or characteristic described with reference to this embodiment or example is included in at least one embodiment or example of the present application. In the present specification, a schematic statement for the above terms is not necessarily for the same embodiment or example. Besides, the described specific features, structures or characteristics may be combined in any one or more embodiments or examples in a proper manner. A sequence of steps involved in each embodiment is used for schematically explaining implementation of the present application, and the sequence of the steps is not limited and may be adjusted properly as required.

Data acquisition, storage, use and processing in the technical solutions of the present application conform to related provisions of national laws and regulations.

The embodiment of the present disclosure involves the following nouns, which are explained below:
MMC-HVDC: modular multilevel converter-high-voltage direct current;
IGBT: insulated gate bipolar transistor;
PPC: performance optimization with enhanced RISC-performance computing, which is a central processing unit (CPU) of a reduced instruction set computer (RISC) architecture; FPGA: field programmable gate array;
VCMI: valve control and monitoring interface;
VGC: valve group control;
ACB: arm control board;
VGCB: valve group control board;
LB: link board;
SSC: system and station control;
CCP: converter control and protection;
VCM: valve control and monitoring;
PMC: power module controller;
SM: sub_module; and
SCADA: supervisory control and data acquisition.

A flexible high voltage direct current transmission technology is a novel direct current transmission technology based on a fully-controlled power electronic device, a voltage source converter and a pulse width modulation technology. Flexible high voltage direct current transmission has control flexibility, thereby having broad application prospects in aspects of renewable energy grid-connection such as large-scale wind power, supplying power to a passive network, urban distribution network capacity-increasing, asynchronous alternating current power grid interconnection, etc. Besides, compared with a conventional thyristor valve, a flexible direct current valve does not need a filter, a direct current bus does not need a capacitor, a valve group uses a modular design and redundancy control, not only are capacity expansion and maintenance facilitated, but also advantages of many output voltage levels, low harmonic content, low switching loss and the like are achieved.

A flexible high voltage direct current transmission control and protection system is "brain" of flexible high voltage direct current system and is responsible for controlling a flexible direct current system to run stably and guaranteeing rapid and accurate actions of a protector. A hierarchical architecture of the flexible direct current control and protection system is shown in FIG. 1 and may be divided into four hierarchies, namely, system and station control (SSC), converter control and protection (CCP, also called polar control), valve control and monitoring (VCM) and power module controller (PMC). The valve control and monitoring (VCM) may further be divided into two hierarchies, namely, a valve control and monitoring interface (VCMI) and a valve group control (VGC), the VCMI is also called a valve control main machine screen, and the VGC is also called a pulse distribution screen. The VCM belongs to a valve-hierarchy control and protection system in all control hierarchies of a converter station and mainly completes pulse modulation, pulse distribution and related protection functions of a converter valve. The VCM receives a control and protection command issued by the CCP and feeds back a part of state information of the converter valve to the CCP, and meanwhile sends a control command to a lower-hierarchy pulse distribution screen and receives power module state and fault information received by the pulse distribution screen.

Figure 2:
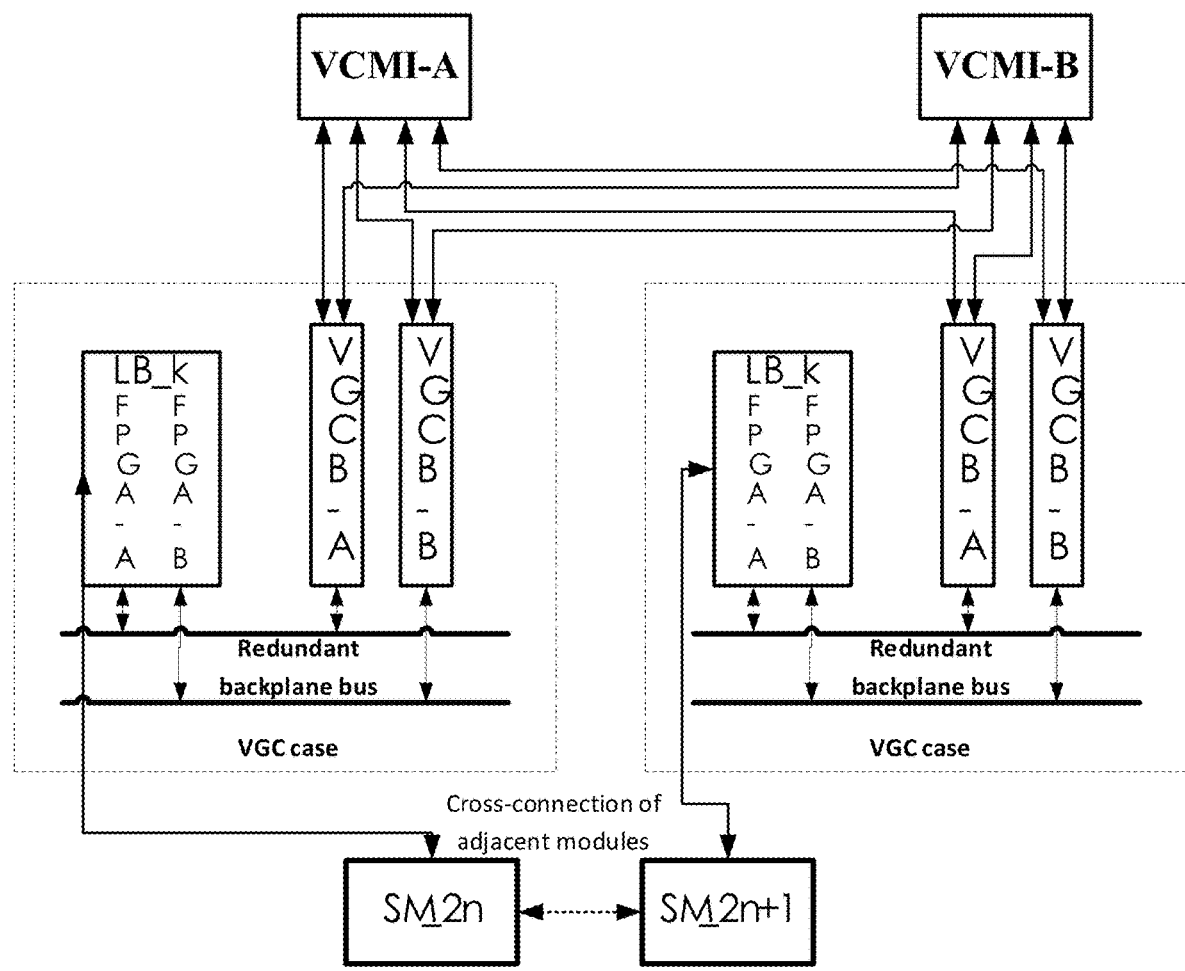
FIG. 2 is a specific example diagram of a valve control mainstream redundant link in the prior art in an embodiment of the present disclosure.

For improving reliability of the valve control and monitoring (VCM) of a valve control device, the valve control and monitoring (VCM) adopts a redundant heat standby system running manner. At present, a schematic diagram of a valve control mainstream redundant link is shown in FIG. 2, redundancy is achieved between the VCMI and the VGC by using a cross communication manner, namely, an arm control board in the VCMI is in cross connection with a VGCB (switch board) in the VGC, dual VGCBs are arranged in a VGC case, and an LB (pulse distribution board) is provided with dual FPGAs, wherein VGCB-A/VGCB-B and the LB FPGA-A/FPGA-B are provided with an independent communication bus. In addition to this, flexible direct current valve sub-modules are interconnected between odd numbers and even numbers according to module numbers, different VGC cases are connected with odd number modules or even number modules, and thus a purpose of not affecting continuous running of a system when a single VGC case has a power failure is achieved. When using the above redundancy technology, the arm control board in the VCMI case will receive four pieces of state information of the same module, the arm control board needs to select one from the four pieces of state information; the power module controller (PMC) performs a sidelink channel instruction when downlink sidelink communication is effective, and otherwise performs a cross communication instruction of adjacent modules, and the downlink sidelink communication here is a single-channel communication, which involves an issue of selection of a sending optical module by dual FPGAs of the LB, namely, an issue of system redundancy control.

Figure 3:
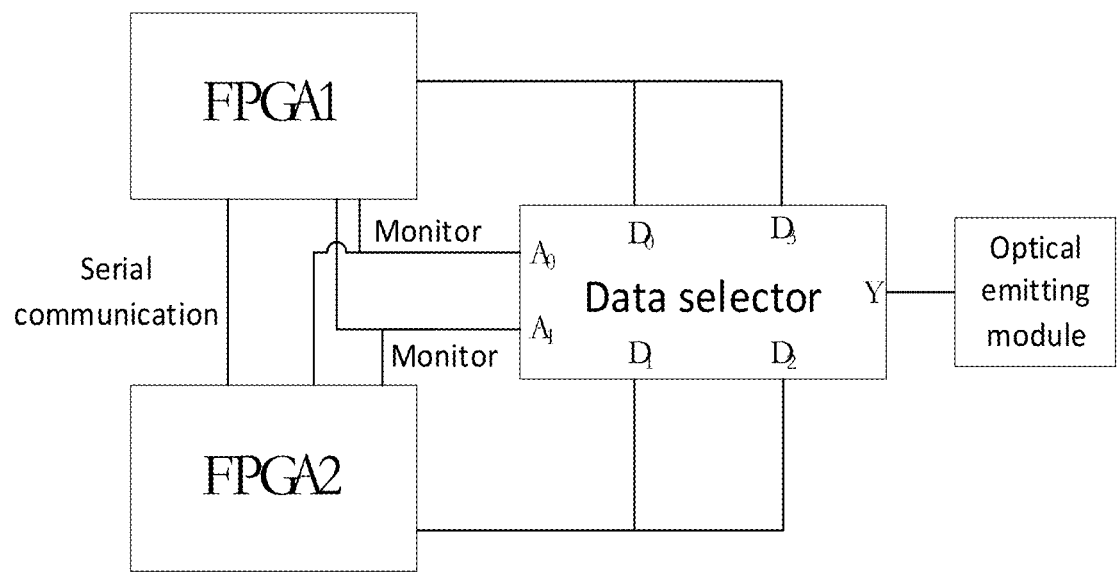
FIG. 3 is a specific example diagram of a circuit for controlling an optical module by dual FPGAs of a typical pulse distribution board in an embodiment of the present disclosure.

For guaranteeing reliability of control over the sending optical module by the dual FPGAs of the LB, not only are normal working conditions of the FPGAs considered, but also it is guaranteed that an output of the optical module is controlled effectively when the FPGAs break down. A circuit for controlling the optical module by the dual FPGAs of the typical pulse distribution board is shown in FIG. 3, including: a data selector, a serial communication monitoring link between the dual FPGAs, and a circuit for monitoring control pins A0 and A1 of the data selector by the dual FPGAs. A function table of the data selector is shown in Table 1. It may be seen with reference to a connection relationship that when control signals outputted by the FPGA1 and the FPGA2 to the data selector are the same, the optical emitting module outputs a trigger pulse of the FPGA1, and when control signals outputted by the FPGA1 and the FPGA2 to the data selector are opposite, the optical emitting module outputs a trigger pulse of the FPGA2. The circuit may guarantee accurate switching when the single FPGA crashes, for example, when the FPGA1 crashes, the FPGA2 may know a control signal state when the FPGA1 crashes through monitoring of the control signal to the data selector by the FPGA1, and then make the signal opposite so that the FPGA2 may control the output of the optical emitting module; and likewise, when the FPGA2 crashes, the FPGA1 outputs a control signal the same as the FPGA2, and the output of the optical emitting module may be controlled by the FPGA1.

TABLE 1

| $A_1$ | $A_0$ | Y |
|---|---|---|
| 0 | 0 | $D_0$ |
| 0 | 1 | $D_1$ |
| 1 | 0 | $D_2$ |
| 1 | 1 | $D_3$ |

At the present stage, there are the following two solutions for controlling redundancy of a valve control system of a converter valve.

First, a data selection module is controlled to switch based on the valve control pulse distribution board of the dual FPGA redundancy design by using the FPGA1.

Second, hardware full redundancy except a transceiving optical head is implemented by a design solution of a VBC optical trigger report board based on dual FPGA redundant configuration, and meanwhile, a dual FPGA redundancy switching method is provided.

However, the above solution has the following drawbacks at present.

As for the first solution, controlling the data selection module to switch by using the FPGA1 is not reliable, the optical module may be controlled by the FPGA2 to send a trigger pulse when the FPGA1 has a power loss, but when the FPGA1 crashes and a pin from the FPGA1 to the data selection module maintains a high-level output, the FPGA2 cannot control the optical module to send the trigger pulse.

The above second solution has the following three problems:

first, a situation that on-duty states of both the FPGA1 and the FPGA2 are active states is not supported. When the FPGA1 is the active state, the FPGA1 sets its control signal outputted to the selector as being opposite to the control signal of the FPGA2 to the data selector according to the monitored control signal outputted by the FPGA2 to the data selector, so that controlling the output of the optical module by the FPGA1 is implemented; and when the FPGA2 is the active state, the FPGA2 sets its control signal outputted to the selector as being the same as the control signal of the FPGA1 to the data selector according to the monitored control signal outputted by the FPGA1 to the data selector, so that controlling the output of the optical module by the FPGA2 is implemented. Therefore, it may be known that when both the FPGA1 and the FPGA2 are active states, the control signals outputted by the two FPGAs need to be opposite, or the control signals outputted by the two FPGAs need to be the same, which preempts the control permission, and the system cannot be stable. As for a redundancy control system, double active states (both are active states) usually need to be supported for running, but strategies of the current solutions cannot ensure stable running under the working conditions of the double active states.

Second, a control mechanism of the FPGA for the data selector is established based on knowing the control signal outputted by the other FPGA for the data selector, only one monitoring channel in the two FPGAs monitors the signal, and when a fault of a monitoring channel for the control signal of the other FPGA cannot be judged, reliable output of the optical module cannot be controlled.

Third, when a communication from one switch board 1 to the FPGA1 of the pulse distribution board breaks down, and a communication from one switch board 2 to the FPGA2 of the other pulse distribution board in the same case breaks down, if this solution is applied, the optical emitting module can be controlled only by the FPGA1 or the FPGA2 of all the pulse distribution boards in the same case, and consequently, not all of them can issue the trigger pulse accurately.

Different from the above second solution for controlling redundancy of the valve control system of the converter valve, an embodiment of the present disclosure has the following advantages:

1, as for the first problem in the above second solution: control over the data selector by the FPGA in the present disclosure is different from this solution, when both the FPGA1 and the FPGA2 are the active states, both the FPGAs output a high level to the data selector, and finally, the optical emitting module is controlled by the FPGA1.

2, As for the second problem in the above second solution: in addition to arranging the monitoring channel between the dual FPGAs in the present disclosure, a standby monitoring channel is also arranged between superior board cards of the dual FPGAs, a risk of a single source is avoided, and system running reliability is improved.

3, As for the third problem of the above second solution: the present disclosure may comprehensively judge a fault grade of pulse distribution cases which are mutually redundant through the valve control main machine, it is supported that redundant pulse distribution case channels send active signals at the same time, namely, after the communication from the switch board to the FPGA of the pulse distribution board breaks down, the other FPGA of the pulse distribution board may control the optical emitting module in time, and thus the trigger pulse is issued accurately.

To sum up, with deep development of a VSC-HVDC flexible direct current technology, the requirement for reliability of flexible direct current control and protection is higher and higher. A valve control system serves as "brain' of control over safe and stable running of a flexible direct current converter valve, so its full redundancy design is an effective means for improving flexible direct current reliability. At present, a full redundancy design of valve control, as shown in FIG. 1, may be summarized as: two valve control main machines which are independent of each other and mutually redundant, a pulse distribution case provided with independent switch boards (corresponding to the two valve control main machines) and a pulse distribution board, in the pulse distribution case, provided with two FPGA chips (each FPGA chip is provided with an independent power supply, an independent crystal oscillator, and an independent communication bus). Currently, what has no full redundancy in valve control is merely an optical module that interfaces with a module, but this issue has been solved through a module cross communication. Though a valve control hardware redundancy design has been an embryo, how to ensure reliability and rapidity of redundancy switching through a combination of software and hardware is also an important issue. For example, how does the valve control pulse distribution board guarantee reliable switching in a case that any FPGA crashes, how to guarantee that the dual FPGAs do not preempt the optical module, and how do an arm control board and switch boards cooperatively guarantee accurate and timely action of the system. The present disclosure is intended to generate a complete redundancy control strategy, so as to improve valve control switching reliability and rapidity, enhance system running stability and avoid unnecessary system halt.

Figure 5:
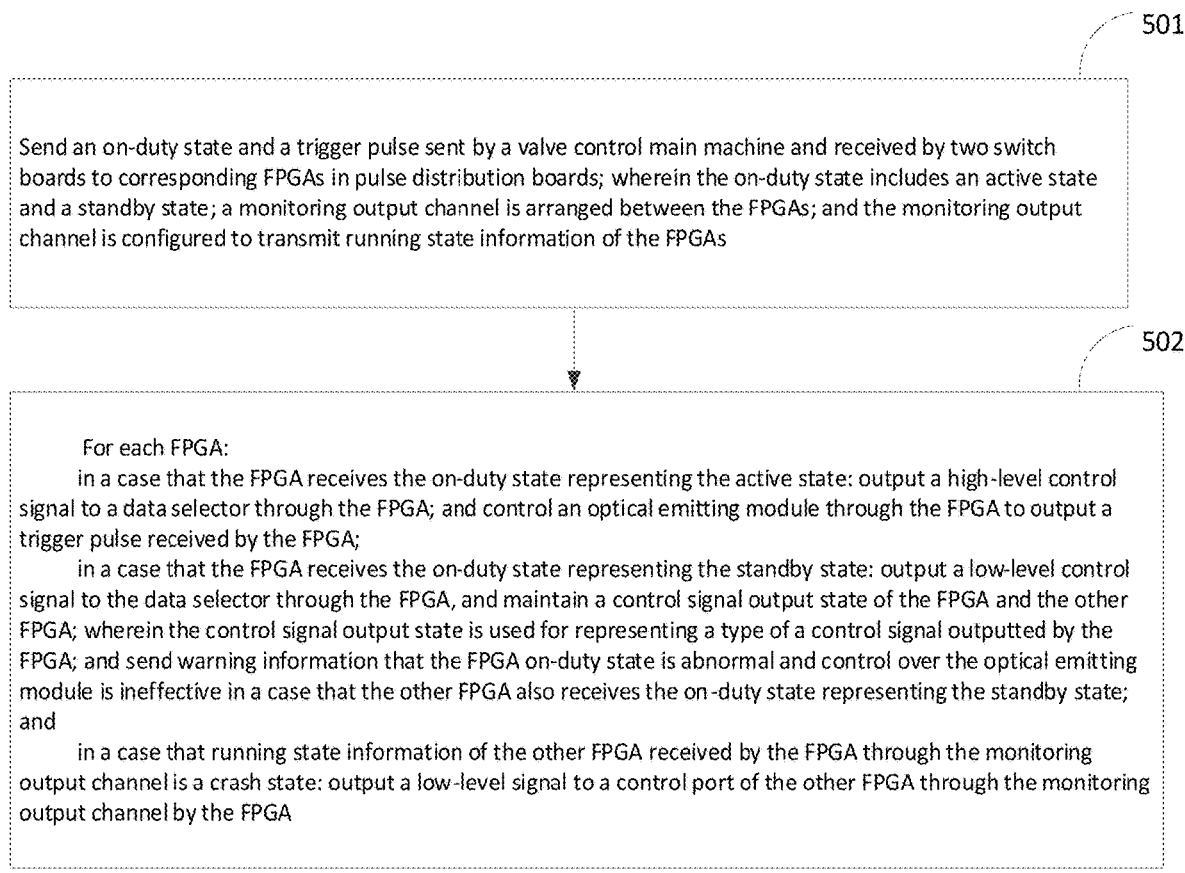
FIG. 5 is a schematic flowchart of a method for controlling redundancy of a valve control system of a converter valve in an embodiment of the present disclosure.

For solving the above problems, an embodiment of the present disclosure provides a method for controlling redundancy of a valve control system of a converter valve, applied to a valve control pulse distribution case in the valve control system of the converter valve. The valve control pulse distribution case includes two switch boards and pulse distribution boards connected to the two switch boards. Each pulse distribution board includes an FPGA and an optical module connected correspondingly with each switch board so as to implement efficient control over redundancy of the valve control system of the converter valve, improve valve control switching reliability and fault response speed, and enhance system running stability. As shown in FIG. 5, the method includes:

step 501: an on-duty state and a trigger pulse sent by a valve control main machine and received by the two switch boards are sent to the corresponding FPGAs in the pulse distribution boards; wherein the on-duty state includes an active state and a standby state; a monitoring output channel is arranged between the FPGAs; and the monitoring output channel is configured to transmit running state information of the FPGAs;

step 502: for each FPGA:

in a case that the FPGA receives the on-duty state representing the active state: a high-level control signal is outputted to a data selector through the FPGA; and an optical emitting module is controlled through the FPGA to output a trigger pulse received by the FPGA;

in a case that the FPGA receives the on-duty state representing the standby state: a low-level control signal is outputted to the data selector through the FPGA, and a control signal output state of the FPGA and the other FPGA is maintained; wherein the control signal output state is used for representing a type of a control signal outputted by the FPGA; and warning information that the FPGA on-duty state is abnormal and control over the optical emitting module is ineffective is sent in a case that the other FPGA also receives the on-duty state representing the standby state; and in a case that running state information of the other FPGA received by the FPGA through the monitoring output channel is a crash state: a low-level signal is outputted to a control port of the other FPGA through the monitoring output channel by the FPGA.

During specific implementation, first, the on-duty state and the trigger pulse sent by the valve control main machine and received by the two switch boards are sent to the corresponding FPGAs in the pulse distribution boards; wherein the on-duty state includes the active state and the standby state; the monitoring output channel is arranged between the FPGAs; and the monitoring output channel is configured to transmit the running state information of the FPGAs.

In an embodiment, the method further includes:

connecting monitoring pins of the two FPGAs to form the monitoring output channel; wherein the monitoring output channel is specifically configured to: inter-transmit running state information between the two FPGAs in a case that running state information of the other FPGA received by the FPGA through the monitoring output channel is not a crash state.

The monitoring pins of the two FPGAs are connected to form the monitoring output channel; and the monitoring output channel is specifically configured to: set the monitoring output channel of the FPGA as a control output low level in a case that the running state information of the other FPGA is judged to be a crash state, otherwise, set the monitoring output channel of the FPGA as a monitoring input channel.

In an embodiment, a backplane monitoring channel is further arranged between the two switch boards; and the backplane monitoring channel is configured to inter-transmit the running state information, between the two switch boards, of the FPGAs connected correspondingly with the two witch boards.

In the embodiment, the FPGAs may also send monitoring channel information to the corresponding switch boards; and a standby monitoring channel is arranged between the two switch boards and configured to assist in monitoring channel states and information between the FPGAs.

In an embodiment, in a case that the running state information of the other FPGA received by the FPGA through the monitoring output channel is the crash state: outputting the low-level signal to the control port of the other FPGA through the monitoring output channel by the FPGA includes:

in a case that the running state information of the other FPGA received by the FPGA through the monitoring output channel is the crash state and running state information of the other FPGA received by the switch board connected with the FPGA through the backplane monitoring channel is a crash state: outputting the low-level signal to the control port of the other FPGA through the monitoring output channel by the FPGA.

In an embodiment, the method further includes:

determining that the other FPGA receives the on-duty state representing the active state in a case that the FPGA determines through the monitoring output channel that a control signal outputted by the other FPGA to the data selector is a high level, and/or the switch board connected with the FPGA determines through the backplane monitoring channel that a control signal outputted by the other FPGA to the data selector is a high level.

Specifically, it may be determined that the other FPGA receives the on-duty state representing the active state in a case that the FPGA determines through the monitoring output channel that the control signal outputted by the other FPGA to the data selector is the high level, meanwhile, the on-duty state of the other FPGA received by the FPGA is an active effective serial communication or an ineffective serial communication, and it is determined through a redundant monitoring channel between the switch boards that the other FPGA is in normal communication and is an active state.

In an embodiment, the method further includes:

determining that the other FPGA receives the on-duty state representing the standby state in a case that the FPGA determines through the monitoring output channel that a control signal outputted by the other FPGA to the data selector is a low level, and/or the switch board connected with the FPGA determines through the backplane monitoring channel that a control signal outputted by the other FPGA to the data selector is a low level.

Specifically, it may be determined that the other FPGA receives the on-duty state representing the standby state in a case that the FPGA determines through the monitoring output channel that the control signal outputted by the other FPGA to the data selector is the low level, meanwhile, the on-duty state of the other FPGA received by the FPGA is a standby effective serial communication or an ineffective serial communication, and it is determined through the redundant monitoring channel between the switch boards that the other FPGA is in normal communication and is a standby state.

In an embodiment, the method further includes:
determining that the running state information of the other FPGA is the crash state in a case that the FPGA cannot determine the control signal output state of the other FPGA through the monitoring output channel, and/or the switch board connected with the FPGA cannot determine the control signal output state of the other FPGA through the backplane monitoring channel.

Specifically, it may be determined that the other FPGA is in the crash state in a case that the FPGA judges that a serial communication of the other FPGA breaks down and the redundant monitoring channel between the switch boards also judges that the other FPGA is in abnormal communication.

During specific implementation, after the on-duty state and the trigger pulse sent by the valve control main machine and received by the two switch boards are sent to the corresponding FPGAs in the pulse distribution boards, for each FPGA:
first, in a case that the FPGA receives the on-duty state representing the active state: the high-level control signal is outputted to the data selector through the FPGA; and the optical emitting module is controlled through the FPGA to output the trigger pulse received by the FPGA;
wherein in a case that the FPGA receives the on-duty state representing the active state: the high-level control signal is outputted to the data selector through the FPGA; and the optical emitting module is controlled through the FPGA to output in a case that the other FPGA is represented as the standby state; and the optical emitting module is controlled through the FPGA connected with the switch board A to output in a case that the other FPGA is also represented as the active state.

Second, in a case that the FPGA receives the on-duty state representing the standby state: the low-level control signal is outputted to the data selector through the FPGA, and the control signal output state of the FPGA and the other FPGA is maintained; wherein the control signal output state is used for representing the type of the control signal outputted by the FPGA; and warning information that the FPGA on-duty state is abnormal and control over the optical emitting module is ineffective is sent in a case that the other FPGA also receives the on-duty state representing the standby state;
wherein the low-level control signal is outputted to the data selector through the FPGA; and the optical emitting module is controlled through the other FPGA to output in a case that the FPGA receives the on-duty state representing the standby state and the other FPGA receives the on-duty state representing the active state.

Third, in a case that the running state information of the other FPGA received by the FPGA through the monitoring output channel is the crash state: the low-level signal is outputted to the control port of the other FPGA through the monitoring output channel by the FPGA.

The control signal output state of the FPGA and the other FPGA is maintained in a case that both the FPGA and the other FPGA receive the on-duty state representing the standby state, at the moment, the optical emitting module sends warning information of ineffective control so that the module remains the final effective trigger pulse, and if the on-duty state representing the active state is not yet received within set time, warning for indicating that the FPGA on-duty state is abnormal is sent.

An example for operation for each FPGA is given below.

1, the high-level control signal is outputted to the data selector through the FPGA in a case that the FPGA receives the on-duty state representing the active state; further, the optical emitting module is controlled through the FPGA to output in a case that the other FPGA is represented as the standby state; and otherwise, the optical emitting module is controlled through the FPGA connected with the switch board A to output in a case that the other FPGA is also represented as the active state.

2, The low-level control signal is outputted to the data selector through the FPGA; and the optical emitting module is controlled through the other FPGA to output in a case that the FPGA receives the on-duty state representing the standby state and the other FPGA receives the on-duty state representing the active state.

3. The control signal output state of the FPGA and the other FPGA is maintained in a case that both the FPGA and the other FPGA receive the on-duty state representing the standby state, at the moment, the optical emitting module sends warning information of ineffective control so that the module remains the final effective trigger pulse, and if the on-duty state representing the active state is not yet received within set time, warning for indicating that the FPGA on-duty state is abnormal is sent; and the control signal output state is used for representing a state for controlling the optical emitting module to output.

4. The low-level signal is outputted to the control port of the other FPGA through the monitoring output channel by the FPGA, the high-level control signal is outputted to the data selector and the control signal output state of the FPGA is maintained in a case that it is judged through the monitoring output channel and the redundant monitoring channel that the running state information of the other FPGA is the crash state and the FPGA receives the on-duty state representing the active state; and the FPGA waits for being switched to the active state in a case that the FPGA receives the on-duty state representing the standby state, warning information for indicating that the FPGA on-duty state is abnormal is sent in a case that the FPGA is not switched to the active state within set time, and otherwise, the optical emitting module is controlled through the active FPGA to output.

In an embodiment, the above method further includes:
determining fault grades of different valve control pulse distribution cases; using a valve control pulse distribution case link with a low fault grade as an active case link; and using another valve control pulse distribution case link as a standby case link;

using a valve control main machine corresponding to the active case link as a target on-duty valve control main machine; and sending the on-duty state and the trigger pulse sent by the valve control main machine and received by the two switch boards to the corresponding FPGAs in the pulse distribution boards includes:

sending an on-duty state and a trigger pulse sent by the target on-duty valve control main machine and received by the two switch boards to the corresponding FPGAs in the pulse distribution boards.

In an embodiment, the above method further includes:

connecting the valve control pulse distribution case to an on-duty valve control main machine and a standby valve control main machine.

The method further includes:

receiving an on-duty state and a trigger pulse sent by the standby valve control main machine in a case that the switch boards receive the on-duty state and the trigger pulse sent by the valve control main machine and do not receive the on-duty state and the trigger pulse sent by the on-duty valve control main machine;

sending the on-duty state representing the standby state through the switch boards in a case that the on-duty states and the trigger pulses sent by both the on-duty valve control main machine and the standby valve control main machine are not received.

In the embodiment, the valve control main machine may comprehensively judge fault grades of the mutually redundant pulse distribution cases; a valve control main machine that judges that the comprehensive fault grade of a pulse distribution case is low is preferentially used as an on-duty main machine; and a valve control main machine that judges that the comprehensive fault grade of a pulse distribution case is high is preferentially used as a standby main machine.

Specifically, comprehensively judging the fault grades of the mutually redundant pulse distribution cases by the valve control main machine may include:

reporting a minor fault or an ordinary fault by the valve control main machine in a case that a redundant link capable of compensating for a current fault link exists in the pulse distribution cases by considering a redundancy communication characteristic between the pulse distribution cases, the valve control main machines and modules; and reporting a major fault by the valve control main machine and needing to apply for switching from a polar control in a case that the redundant link of the pulse distribution cases runs out and a system cannot be supported for normal running.

For example, the low-level signal is outputted to the control port of the other FPGA through the monitoring output channel by the FPGA, the high-level control signal is outputted to the data selector and the control signal output state of the FPGA is maintained in a case that it is judged through the monitoring output channel and the redundant monitoring channel that the running state information of the other FPGA is the crash state and the FPGA receives the on-duty state representing the active state; and the FPGA waits for being switched to the active state in a case that the FPGA receives the on-duty state representing the standby state, warning information for indicating that the FPGA on-duty state is abnormal is sent in a case that the FPGA is not switched to the active state within set time, and otherwise, the optical emitting module is controlled through the active FPGA to output.

A specific application of the method of the present disclosure is described below by taking a specific embodiment.

The following four strategies for controlling redundancy of a valve control pulse distribution case of a flexible direct current transmission converter valve are provided in the specific embodiment, for example, a pulse distribution case redundancy switching strategy, a valve control main machine to pulse distribution case on-duty strategy, an on-duty strategy of the switch boards to the pulse distribution boards in the pulse distribution cases, and an output control strategy of the dual FPGAs of the pulse distribution boards.

First, the pulse distribution case redundancy switching strategy is as follows:

A fault type of the pulse distribution cases is divided into four types of faults according to grades, namely, a minor fault, an ordinary fault, a major fault and an emergency fault from minor to serious, which correspond to response actions such as warning, switching and tripping of the valve control main machine.

Second, the valve control main machine to pulse distribution case on-duty strategy is as follows:

after the valve control main machine and the switch boards of the pulse distribution cases adopt the cross communication, two communication links in the cross communication are not set as one being active and the other being standby, on-duty states sent by the on-duty valve control main machines through the cross communication are all active states, and on-duty states sent by standby valve control main machines are all standby states.

Third, the on-duty strategy of the switch boards to the pulse distribution boards in the pulse distribution cases is as follows:

the received on-duty state and trigger pulse of the on-duty main machine are sent to the pulse distribution boards;

a standby on-duty state and trigger pulse are sent to the pulse distribution boards in a case that the on-duty state and the trigger pulse of the on-duty main machine are not received; and the on-duty state is self assigned as a standby state in a case that communications with both main machines break down, and the trigger pulse changed to be standby later is sent to the pulse distribution boards.

A mutual monitoring channel is arranged between the two switch boards, is configured to monitor a fault state and the on-duty state and serves as auxiliary basis of judging whether the FPGAs of the pulse distribution boards crash and switching control over the optical module.

Fourth, the output control strategy of the dual FPGAs of the pulse distribution boards is as follows:

the other FPGA is provided with the monitoring output channel on a control signal circuit of the FPGA to the data selector, and not only can monitor, but also can output a lower level to forcefully pull down a control pin in a case of discovering that the FPGA crashes and that an output state of the FPGA is uncertain.

When the two FPGAs work normally: the FPGA receives an on-duty signal of being the active state, directly outputs the high-level control signal to the data selector and uses a monitoring output pin as an input pin for use of monitoring; when the FPGA receives an on-duty signal of being the standby state and the other FPGA receives the on-duty signal of being the active state, the FPGA outputs the low-level control signal to the data selector, and uses the monitoring output pin as the input pin for use of monitoring; and when the FPGA receives the on-duty signal of being the standby state and the other FPGA receives the on-duty signal of being the standby state, control signals of the two FPGAs to the data selector do not change, a principle of "standby being active' is implemented, the FPGA changed to be standby continues controlling the optical module to output and informs sub-modules that the on-duty state is abnormal now, and a control instruction is ineffective.

When the current FPGA discovers that the other FPGA is in the crash state: the FPGA outputs the low level through the monitoring output channel and sends a high level to a control pin of the data selector, and when the FPGA is the active state, the FPGA normally controls the optical module to output an instruction, and when the FPGA is the standby state, the optical module is controlled to output and the sub-modules are informed that the on-duty state is abnormal now, and the control instruction is ineffective.

The above four strategies are described in detail below.

First, the pulse distribution case redundancy switching strategy is as follows in details:

the fault type of the pulse distribution cases is divided into four types of faults according to grades, namely, a minor fault, an ordinary fault, a major fault and an emergency fault from minor to serious, which correspond to response actions such as warning, switching and tripping of the valve control main machine.

The first type of minor fault, for example, a single fault on a redundant link in the pulse distribution cases, which does not affect normal running of the system and only gives an alarm without taking actions.

The second type of ordinary fault, for example, the valve control main machine receives the same fault of the two switch boards of the same pulse distribution case, which results in that the valve control main machine cannot control a plurality of modules or recognize a plurality of module states on the pulse distribution case through a module sidelink optical fiber, but the plurality of modules that cannot be controlled or recognized can be controlled by the matching pulse distribution case through a cross connection between the modules so as to continue supporting running of the system. At the moment, if the other valve control main machine judges that the pulse distribution case has no fault or a grade of the occurring fault is less than this type of fault, this valve control main machine requests for switching, and otherwise, only an alarm is given without requesting for switching.

The third type of major fault, for example, the valve control main machine cannot control the plurality of modules or recognize the plurality of module states due to a fault of the redundant pulse distribution case (the matching pulse distribution case), if the other valve control main machine judges that the fault grade of the pulse distribution case is less than the present fault grade, this valve control main machine applies for switching, and otherwise, when the number of modules that cannot be controlled or recognized is less than the number of redundancies, only an alarm is given without requesting for switching.

The fourth type of emergency fault, for example, the valve control main machine cannot control the plurality of modules or recognize the plurality of module states due to the fault of the redundant pulse distribution case (matching pulse distribution case), the number of modules that cannot be controlled or recognized exceeds the number of redundancies, and if the other valve control main machine judges that the fault grade of the pulse distribution case is not less than the present fault grade, the valve control main machine applies for tripping.

First, the valve control main machine to pulse distribution case on-duty strategy is as follows in details:

after the valve control main machine and the switch boards of the pulse distribution cases adopt the cross communication, on-duty states sent by the on-duty valve control main machine are all active states, the two communication links in the cross communication do not need to be set as one being active and the other being standby, and on-duty states sent by the standby valve control main machine are all standby states.

Accordingly, in a normal case, the two switch boards in the pulse distribution case may receive information of the on-duty main machines and select the on-duty information for issuing, the on-duty valve control main machine does not need to distinguish a master-slave relationship of the two switch boards, meanwhile, redundancies of a VGC downlink are added directly, the two mutually redundant switch boards and the different pulse distribution boards have a communication fault, the system may continue running normally without taking any action, and unnecessary switching is avoided.

Third, the on-duty strategy of the switch boards to the pulse distribution boards in the pulse distribution cases is as follows in details:

the received on-duty state and trigger pulse of the on-duty main machine are sent to the pulse distribution boards; the standby on-duty state and trigger pulse are sent to the pulse distribution boards in a case that the on-duty state and the trigger pulse of the on-duty main machine are not received; and the on-duty state is self assigned as the standby state in a case that the communications with the two main machines break down.

Besides, the two switch boards have fixed positions in the pulse distribution case and are provided with different address codes through a backplane so as to serve as identities for distinguishing the two switch boards A/B, the address codes are sent to the pulse distribution boards to serve as identities for distinguishing the dual FPGAs of the pulse distribution boards, namely, the FPGA of the pulse distribution board communicating with the switch board A is FPGA-A, and the FPGA of the pulse distribution board communicating with the switch board B is FPGA-B. A backplane LVDS monitoring channel is arranged between the two switch boards for monitoring the communication fault state and the on-duty state between the switch boards and the pulse distribution boards and between the two FPGAs of the pulse distribution board to serve as an auxiliary basis for judging whether the FPGAs crash and switching.

Fourth, the output control strategy of the dual FPGAs of the pulse distribution boards is as follows in details:

the other FPGA is provided with the monitoring output channel on the control signal circuit of the FPGA to the data selector, and not only can monitor, but also can output the lower level to forcefully pull down the control pin in a case of discovering that the FPGA crashes and that the output state of the FPGA is uncertain. When the FPGA-A receives the on-duty state of being the active state, the optical emitting module is controlled by the FPGA-A to output in spite of the FPGA-B on-duty state being the active state or the standby state. When the FPGA-A receives the on-duty state of being standby state, and the FPGA-B receives the on-duty state of being the active state, the optical emitting module is controlled by the FPGA-B to output. When the on-duty signals received by the FPGA-A and the FPGA-B are all standby states, the FPGA changed to be standby later continues controlling the optical module to output and informs the sub-modules that the on-duty state is abnormal now, and the control instruction is ineffective (when the module receives the on-duty state of being ineffective but it is not a downlink communication fault, bypassing is not performed automatically, so other faults of the system caused by a large-area bypassing of the module are prevented).

Figure 4:
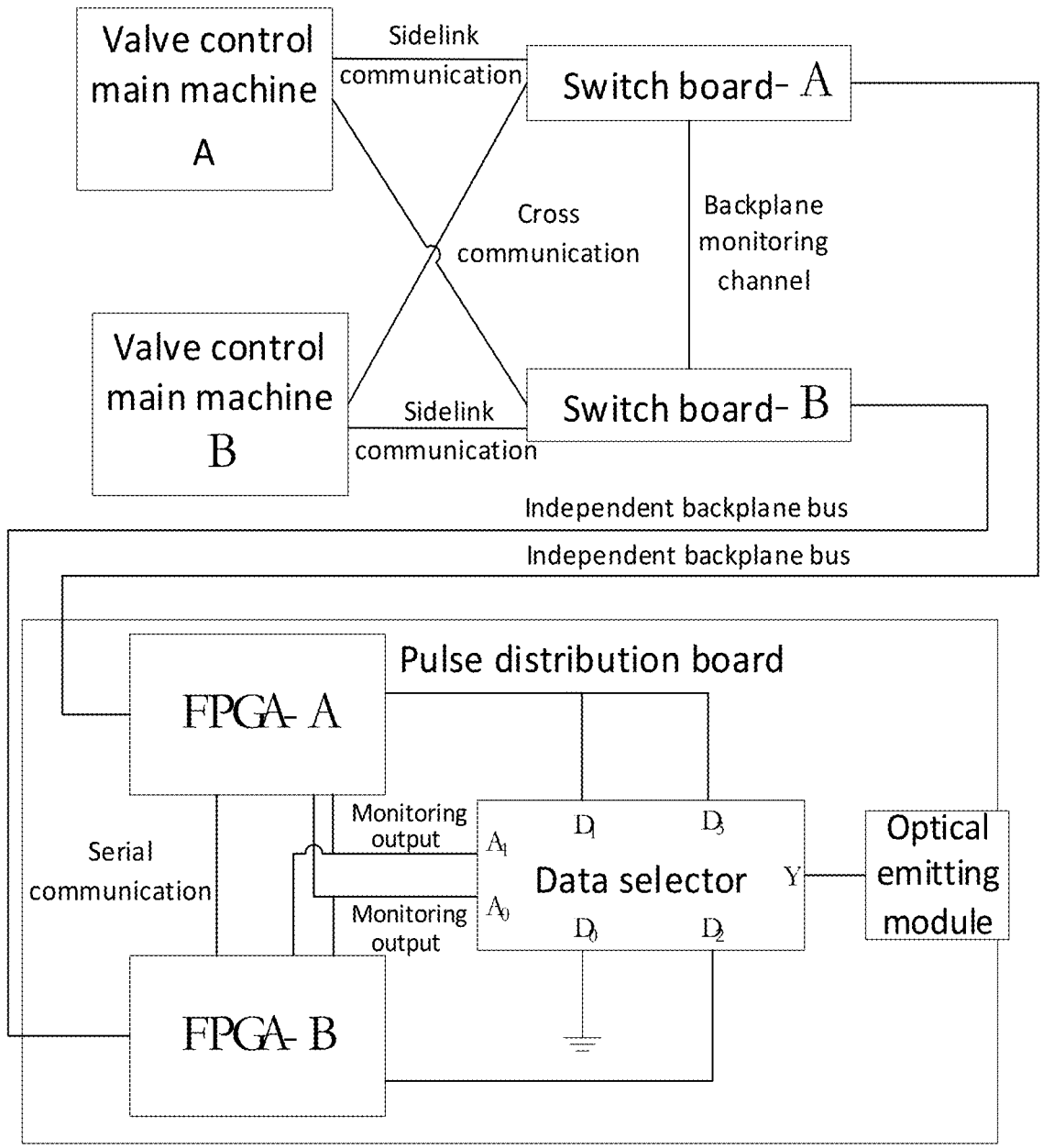
FIG. 4 is a specific example diagram of an internal connection relationship of a valve control pulse distribution case in an embodiment of the present disclosure.

A connection relationship between the FPGAs of the pulse distribution board and the data selector is shown in FIG. 4, a control signal of the FPGA-A to the data selector is connected to a pin A0, a control signal of the FPGA2 to the data selector is connected to a pin A1, a data output of the FPGA-A is connected to pins D1 and D3 of the data selector, a data output of the FPGA-B is connected to a pin D2 of the data selector, and a pin DO is grounded.

When the FPGA receives the on-duty signal of being the active state, the FPGA directly outputs the high-level control signal to the data selector, and uses the monitoring output pin as the input pin for use of monitoring.

When the FPGA receives the on-duty signal of being the standby state and the other FPGA receives the on-duty signal of being the active state, the FPGA outputs the low-level control signal to the data selector, and uses the monitoring output pin as the input pin for use of monitoring.

There are the following several conditions for determining that the other FPGA is the active state: 1. the FPGA monitors through the serial communication that the other FPGA is the active state, and also monitors that the control signal of the other FPGA to the data selector is the high level; and 2. if the FPGA detects a serial communication fault, a VGCB corresponding to the other FPGA monitors that a communication of the FPGA to the VGCB is normal and is the active state, and also monitors that the control signal of the other FPGA to the data selector is the high level.

When the FPGA receives the on-duty signal of being the standby state and the other FPGA receives the on-duty signal of being the standby state, the control signals of the two FPGAs to the data selector do not change, the principle of "standby being active" is implemented, the FPGA changed to be standby later continues controlling the optical module to output and informs the sub-modules that the on-duty state is abnormal now, and the control instruction is ineffective.

Likewise, there are the following several conditions for determining that the other FPGA is the standby state: 1. the FPGA monitors through the serial communication that the other FPGA is the active state, and also monitors that the control signal of the other FPGA to the data selector is the low level; and 2. if the FPGA detects a serial communication fault, a VGCB corresponding to the other FPGA monitors that a communication of the FPGA to the VGCB is normal and is the standby state, and also monitors that the control signal of the other FPGA to the data selector is the low level.

When the FPGA receives the on-duty signal of being the standby state and the other FPGA is in the crash state, the control signals of the FPGA to the data selector do not change, the FPGA continues controlling the optical module to output and informs the sub-modules that the on-duty state is abnormal now, and the control instruction is ineffective.

When the on-duty state of the other FPGA cannot be judged, it is considered that the FPGA is in the crash state. For example, when the FPGA detects the serial communication fault, and the VGCB corresponding to the other FPGA monitors a communication fault of the FPGA to the VGCB, it is considered that the other FPGA crashes.

In a normal case, the on-duty states received by the FPGA-A and the FPGA-B are both the active states, but the FPGA-A controls the optical emitting module to output, at the moment, control over the optical module by the FPGA-A is not affected not matter which fault occurs to the FPGA-B, and a control permission over the optical emitting module may be switched to make the FPGA-B control only when the FPGA-A crashes or the FPGA-A is lowered to be the standby state. If the FPGA-B detects that FPGA-A crashes at the moment, the FPGA-B output the low level through the monitoring output channel to pull down the control signal of the FPGA-A, at the moment, the data selector will be controlled by the FPGA-B in spite of high or low of the control signal of the FPGA-A; and if the FPGA-A channel is lowered to be the standby state due to the communication fault and the like, the FPGA-A pulls down the pin A0 to the data selector, and at the moment, the FPGA-B controls the optical emitting module to output.

To sum up, the embodiment of the present disclosure provides a solution for controlling and switching redundancy of a valve control pulse distribution case of a flexible direct current transmission converter valve. The solution makes the overall strategy of controlling the on-duty states of the arm control board, the switch boards and the pulse distribution boards clear, meanwhile solves the problem of how to control the optical emitting module by the dual FPGAs of the valve control pulse distribution boards, improves the valve control switching reliability and fault response speed, enhances system running stability and avoids unnecessary system halt.

Specifically, in the embodiment of the present disclosure, the valve control main machine comprehensively judges the fault grade of the mutually redundant pulse distribution cases, the valve control main machine with the on-duty state being the active state may send the on-duty state and the trigger pulse through the pulse distribution case redundant channel, the pulse distribution case redundant channel plays a role to the maximum degree, the valve control main machine does not need switching and only an interior of the pulse distribution case needs to be switched before the redundant channel runs out, and thus the valve control switching reliability and the fault response speed are improved, the system running stability is enhanced, and the problem of unnecessary system halt is avoided; the standby monitoring channel is arranged between the switch boards of the pulse distribution case and configured to monitor the FPGAs when the pulse distribution boards have the serial channel fault, so as to avoid occurrence of the situation that a running state cannot be judged and the optical emitting module cannot be controlled when the pulse distribution boards have the serial channel fault; and the monitoring output channel is arranged between the dual FPGAs of the pulse distribution boards of the pulse distribution case, which only achieves an effect of monitoring the control signal, but also serves as an output pin when the other FPGA crashes, the control signal of the FPGA is forcefully pulled down no matter how the control signal outputted by the FPGA that crashes is, the purpose of controlling the optical emitting module by the FPGA is achieved, and accurate control over the optical emitting module in a case that the FPGAs of the valve control pulse distribution boards crash is ensured.

Certainly, it may be understood that the above detailed flows may also have other variations, and the related variations are supposed to fall within the protection scope of the present disclosure.

In the embodiments of the present disclosure, the on-duty state and the trigger pulse sent by the valve control main machine and received by the two switch boards are sent to the corresponding FPGAs in the pulse distribution boards; wherein the on-duty state includes the active state and the standby state; the monitoring output channel is arranged between the FPGAS; and the monitoring output channel is configured to transmit running state information of the FPGAs; for each FPGA: in a case that the FPGA receives the on-duty state representing the active state: the high-level control signal is outputted to the data selector through the FPGA; and the optical emitting module is controlled through the FPGA to output the trigger pulse received by the FPGA; in a case that the FPGA receives the on-duty state representing the standby state: the low-level control signal is outputted to the data selector through the FPGA, and the control signal output state of the FPGA and the other FPGA is maintained; the control signal output state is used for representing the type of the control signal outputted by the FPGA; and warning information that the FPGA on-duty state is abnormal and control over the optical emitting module is ineffective is sent in a case that the other FPGA also receives the on-duty state representing the standby state; and in a case that the running state information of the other FPGA received by the FPGA through the monitoring output channel is a crash state: the low-level signal is outputted to the control port of the other FPGA through the monitoring output channel by the FPGA, thus by arranging the monitoring output channel between the dual FPGAs of the pulse distribution boards of the pulse distribution case, not only is an effect of monitoring the control signal is achieved, but also the other FPGA is pulled down when the other FPGA is in a crash state so that the current FPGA outputs the low-level signal, the problem that dual FPGAs of a valve control pulse distribution board in the prior art cannot effectively control the optical emitting module is solved, efficient control over redundancy of the valve control system of the converter valve is implemented, the valve control switching reliability and fault response speed are improved, the system running stability is enhanced, and the problem of unnecessary system halt is avoided.

An embodiment of the present disclosure further provides an apparatus for controlling redundancy of a valve control system of a converter valve, which is described in the following embodiment. A principle for solving problems by the apparatus is similar to that of the method for controlling redundancy of the valve control system of the converter valve, so implementation of the apparatus may refer to the implementation of the method for controlling redundancy of the valve control system of the converter valve, and repetitions are omitted.

Figure 6:
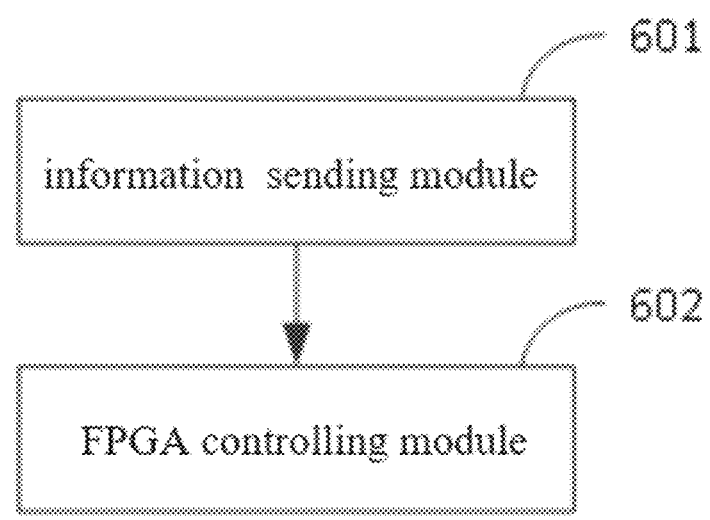
FIG. 6 is a schematic structural diagram of an apparatus for controlling redundancy of a valve control system of a converter valve in an embodiment of the present disclosure.

The apparatus for controlling redundancy of the valve control system of the converter valve provided by the embodiment of the present disclosure is applied to a valve control pulse distribution case in the valve control system of the converter valve. The valve control pulse distribution case includes two switch boards and pulse distribution boards connected to the two switch boards. Each pulse distribution board includes an FPGA and an optical module connected correspondingly with each switch board so as to implement efficient control over redundancy of the valve control system of the converter valve, improve valve control switching reliability and fault response speed, and enhance system running stability. As shown in FIG. 6, the apparatus includes:

an information sending module 601, configured to send an on-duty state and a trigger pulse sent by a valve control main machine and received by the two switch boards to the corresponding FPGAs in the pulse distribution boards; wherein the on-duty state includes an active state and a standby state; a monitoring output channel is arranged between the FPGAs; and the monitoring output channel is configured to transmit running state information of the FPGAs; and an FPGA controlling module 602, configured to, for each FPGA:
in a case that the FPGA receives the on-duty state representing the active state: output a high-level control signal to a data selector through the FPGA; and control an optical emitting module through the FPGA to output a trigger pulse received by the FPGA;
in a case that the FPGA receives the on-duty state representing the standby state: output a low-level control signal to the data selector through the FPGA, and maintain a control signal output state of the FPGA and the other FPGA; wherein the control signal output state is used for representing a type of a control signal outputted by the FPGA; and send warning information that the FPGA on-duty state is abnormal and control over the optical emitting module is ineffective in a case that the other FPGA also receives the on-duty state representing the standby state; and
in a case that running state information of the other FPGA received by the FPGA through the monitoring output channel is a crash state: output a low-level signal to a control port of the other FPGA through the monitoring output channel by the FPGA.

Figure 7:
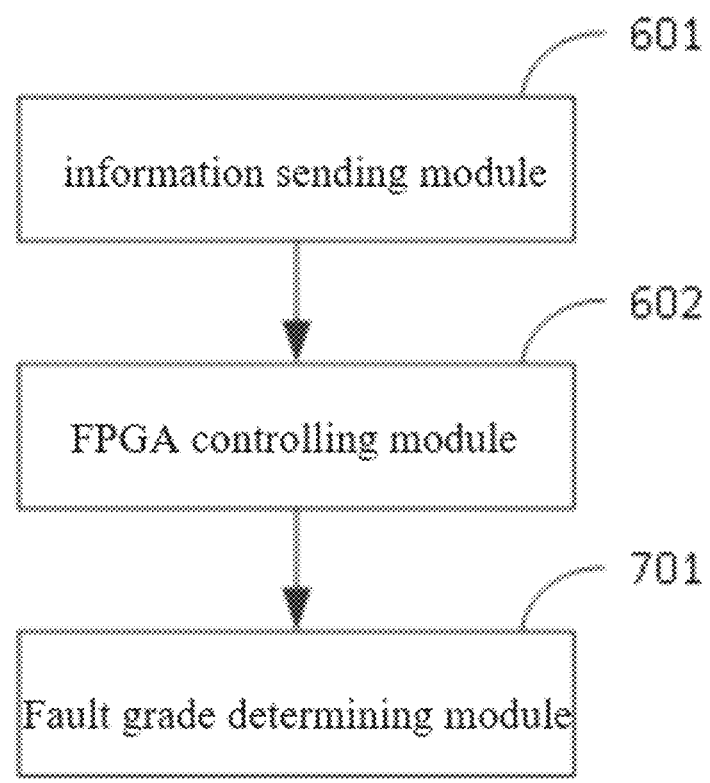
FIG. 7 is a specific example diagram of an apparatus for controlling redundancy of a valve control system of a converter valve in an embodiment of the present disclosure.

In an embodiment, as shown in FIG. 7, the apparatus further includes:
a fault grade determining module 701, configured to:
determine fault grades of different valve control pulse distribution cases; use a valve control pulse distribution case link with a low fault grade as an active case link; and use another valve control pulse distribution case link as a standby case link; and
use a valve control main machine corresponding to the active case link as a target on-duty valve control main machine.

The information sending module is specifically configured to:
send an on-duty state and a trigger pulse sent by the target on-duty valve control main machine and received by the two switch boards to the corresponding FPGAs in the pulse distribution boards.

In an embodiment, the valve control pulse distribution case is connected to an on-duty valve control main machine and a standby valve control main machine.

Figure 8:
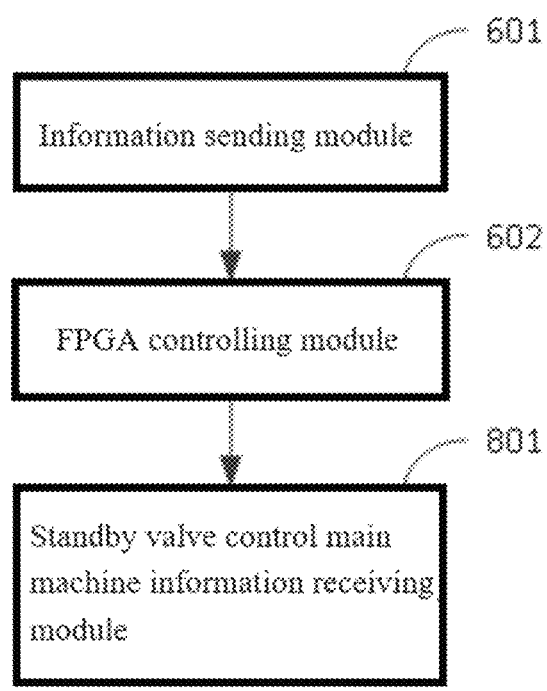
FIG. 8 is a specific example diagram of an apparatus for controlling redundancy of a valve control system of a converter valve in an embodiment of the present disclosure.

As shown in FIG. 8, the apparatus further includes:
a standby valve control main machine information receiving module 801, configured to:
receive an on-duty state and a trigger pulse sent by the standby valve control main machine in a case that the switch boards receive the on-duty state and the trigger pulse sent by the valve control main machine and do not receive the on-duty state and the trigger pulse sent by the on-duty valve control main machine; and
send the on-duty state representing the standby state through the switch boards in a case that the on-duty states and the trigger pulses sent by both the on-duty valve control main machine and the standby valve control main machine are not received.

Figure 9:
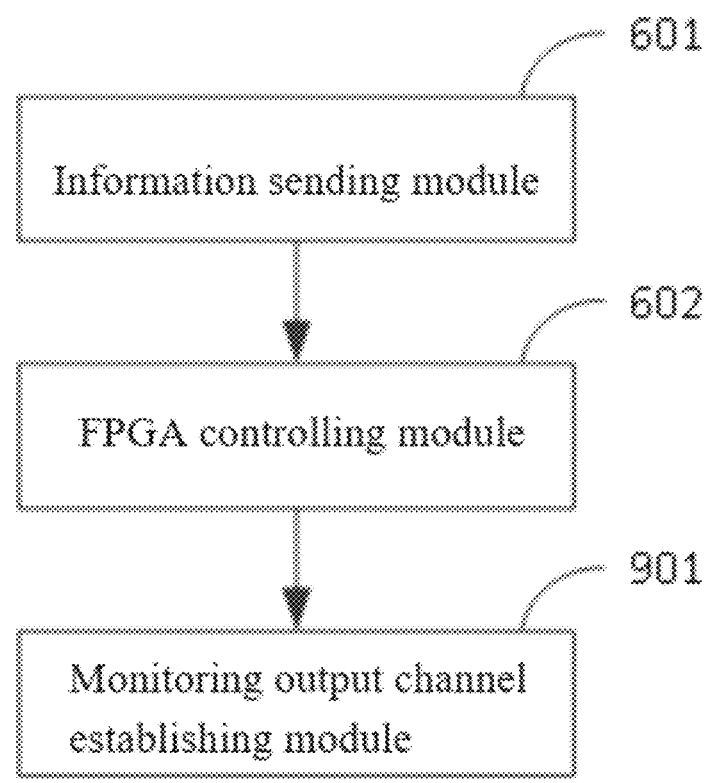
FIG. 9 is a specific example diagram of an apparatus for controlling redundancy of a valve control system of a converter valve in an embodiment of the present disclosure.

In an embodiment, as shown in FIG. 9, the apparatus further includes:

a monitoring output channel establishing module 901, configured to:

connect monitoring pins of the two FPGAs to form a monitoring output channel; wherein the monitoring output channel is specifically configured to: inter-transmit running state information between the two FPGAs in a case that running state information of the other FPGA received by the FPGA through the monitoring output channel is not a crash state.

In an embodiment, a backplane monitoring channel is further arranged between the two switch boards; and the backplane monitoring channel is configured to inter-transmit the running state information, between the two switch boards, of the FPGAs connected correspondingly with the two witch boards.

In an embodiment, the FPGA controlling module is specifically configured to:

in a case that the running state information of the other FPGA received by the FPGA through the monitoring output channel is the crash state and running state information of the other FPGA received by the switch board connected with the FPGA through the backplane monitoring channel is a crash state: output the low-level signal to the control port of the other FPGA through the monitoring output channel by the FPGA.

In an embodiment, the apparatus further includes:

an FPGA on-duty state first determining module, configured to:

determine that the other FPGA receives the on-duty state representing the active state in a case that the FPGA determines through the monitoring output channel that a control signal outputted by the other FPGA to the data selector is a high level, and/or the switch board connected with the FPGA determines through the backplane monitoring channel that a control signal outputted by the other FPGA to the data selector is a high level.

In an embodiment, the apparatus further includes:

an FPGA on-duty state second determining module, configured to:

determine that the other FPGA receives the on-duty state representing the standby state in a case that the FPGA determines through the monitoring output channel that a control signal outputted by the other FPGA to the data selector is a low level, and/or the switch board connected with the FPGA determines through the backplane monitoring channel that a control signal outputted by the other FPGA to the data selector is a low level.

In an embodiment, the apparatus further includes:

an FPGA on-duty state third determining module, configured to:

determine that the running state information of the other FPGA is the crash state in a case that the FPGA cannot determine the control signal output state of the other FPGA through the monitoring output channel, and/or the switch board connected with the FPGA cannot determine the control signal output state of the other FPGA through the backplane monitoring channel.

An embodiment of the present disclosure provides an embodiment of a computer device for implementing all or some contents of the method for controlling redundancy of the valve control system of the converter valve. The computer device specifically includes the following content:

a processor, a memory, a communications interface and a bus; wherein the processor, the memory and the communication interface complete a communication between one another through the bus; the communication interface is configured to implement information transmission between related devices; and the computer device may be a desktop computer, a tablet computer, a mobile terminal, etc., and the present embodiment is not limited to this. In the present embodiment, the computer device may be implemented with reference to the embodiment for implementing the method for controlling redundancy of the valve control system of the converter valve and the embodiment for implementing the apparatus for controlling redundancy of the valve control system of the converter valve, its contents are incorporated herein, and repetitions are omitted.

Figure 10:
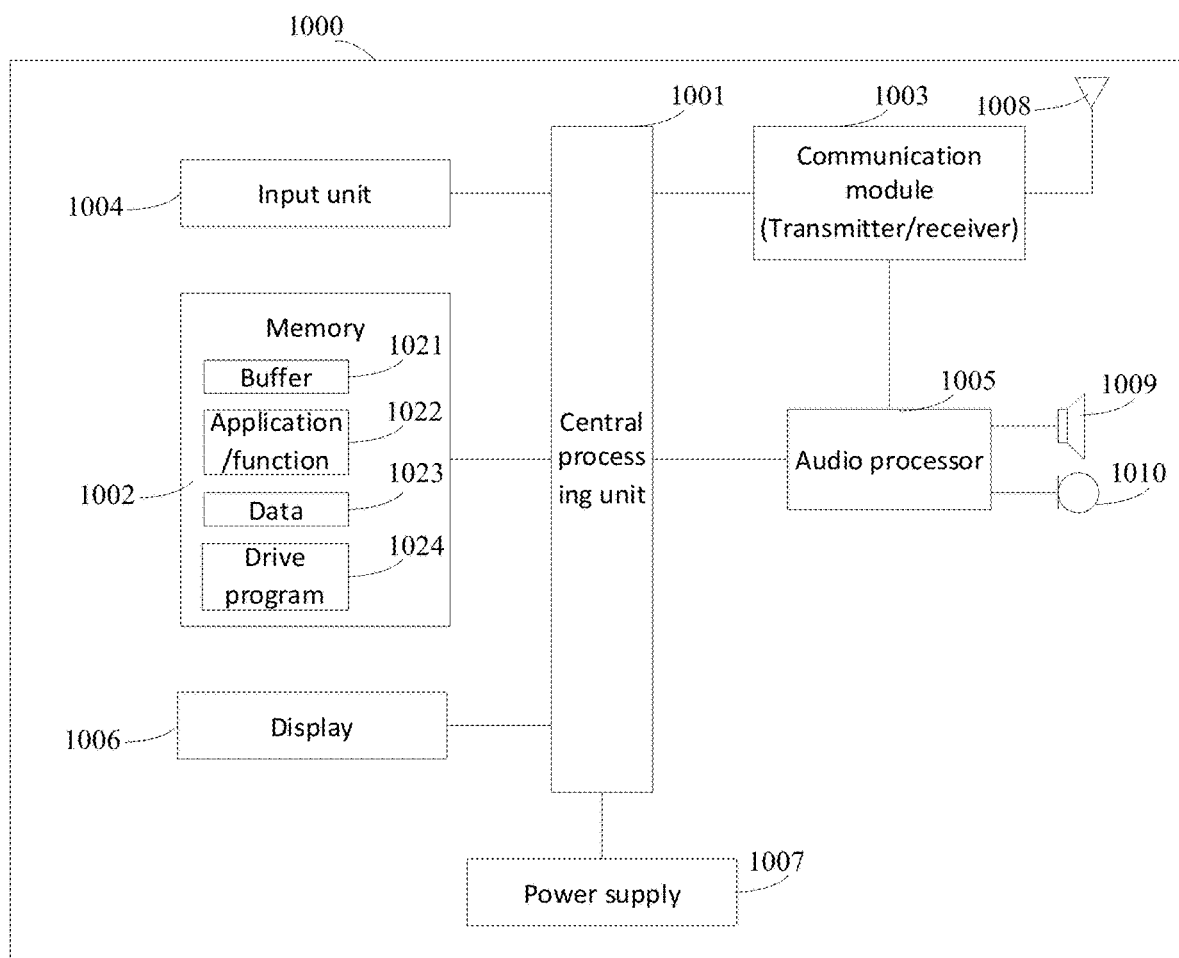
FIG. 10 is a schematic diagram of a computer device for controlling redundancy of a valve control system of a converter valve in an embodiment of the present disclosure.

FIG. 10 is a schematic block diagram of a system composition of a computer device 1000 in an embodiment of the present disclosure. As shown in FIG. 10, the computer device 1000 may include: a central processing unit 1001 and a memory 1002, and the memory 1002 is coupled to the central processing unit 1001. It is worth noting that FIG. 10 is exemplary, and other types of structures may also be used for supplementing or replacing the structure so as to implement a telecommunication function or other functions.

In an embodiment, a function for controlling redundancy of a valve control system of a converter valve may be integrated into the central processing unit 1001. The central processing unit 1001 may be configured to perform the following control:

sending an on-duty state and a trigger pulse sent by a valve control main machine and received by two switch boards to corresponding FPGAs in pulse distribution boards; wherein the on-duty state includes an active state and a standby state; a monitoring output channel is arranged between the FPGAs; and the monitoring output channel is configured to transmit running state information of the FPGAs;

for each FPGA:

in a case that the FPGA receives the on-duty state representing the active state: outputting a high-level control signal to a data selector through the FPGA; and controlling an optical emitting module through the FPGA to output a trigger pulse received by the FPGA;

in a case that the FPGA receives the on-duty state representing the standby state: outputting a low-level control signal to the data selector through the FPGA, and maintaining a control signal output state of the FPGA and the other FPGA; wherein the control signal output state is used for representing a type of a control signal outputted by the FPGA; and sending warning information that the FPGA on-duty state is abnormal and control over the optical emitting module is ineffective in a case that the other FPGA also receives the on-duty state representing the standby state; and in a case that running state information of the other FPGA received by the FPGA through the monitoring output channel is a crash state: outputting a low-level signal to a control port of the other FPGA through the monitoring output channel by the FPGA.

In another implementation, the apparatus for controlling redundancy of the valve control system of the converter valve may be configured separately from the central processing unit 1001, for example, the apparatus for controlling redundancy of the valve control system of the converter valve may be configured as a chip connected with the central processing unit 1001, and the function for controlling redundancy of the valve control system of the converter valve is implemented through control of the central processing unit.

As shown in FIG. 10, the computer device 1000 may further include: a communication module 1003, an input unit 1004, an audio processor 1005, a display 1006 and a power supply 1007. It is worth noting that the computer device 1000 does not necessarily include all components shown in FIG. 10. Besides, the computer device 1000 may further include components not shown in FIG. 10, which may refer to the prior art.

As shown in FIG. 10, the central processing unit 1001 is sometimes called a controller or an operation control and may include a microprocessor or another processor apparatus and/or logical apparatus. The central processing unit 1001 receives an input and controls operations of all components of the computer device 1000.

The memory 1002 may be, for example, one or more of a buffer, a flash memory, a hard drive, a mobile medium, a volatile memory, a non-volatile memory or another proper apparatuses. The above information related to a failure may be stored. Besides, a program for performing the related information may be stored. In addition, the central processing unit 1001 may perform the program stored in the memory 1001 so as to implement information storage or processing.

The input unit 1004 provides an input for the central processing unit 1001. The input unit 1004 may be, for example, press buttons or a touch input apparatus. The power supply 1007 is configured to provide power for the computer device 1000. The display 1006 is configured to display a displayed object such as an image and a text. The display may be, for example, an LCD display and is not limited to this.

The memory 1002 may be a solid state memory, for example, a read-only memory (ROM), a random access memory (RAM), an SIM card, etc. The memory may also be like this, namely, the memory may stores information though a power failure occurs, may be optionally erased and provided with more data, and an example of this type of memory is sometimes called EPROM, etc. The memory 1002 may also be a certain type of other apparatuses. The memory 1002 includes a buffer memory 1021 (called a buffer sometimes). The memory 1002 may include an application/function storage part 1022, the application/function storage part 1022 is configured to store an application program and a function program or configured to perform operation flows of the computer device 1000 through the central processing unit 1001.

The memory 1002 may further include a data storage part 1023, and the data storage part 1023 is configured to store data, for example, contacts, digital data, pictures, sound and/or any other data used by the computer device. A driving program storage part 1024 of the memory 1002 may include various driving programs of the computer device for a communication function and/or for performing other functions (such as a message transmission application and a contact book application) of the computer device.

The communication module 1003 is a transmitter/receiver 1003 for transmitting and receiving a signal via an antenna 1008. The communication module (transmitter/receiver) 1003 is coupled to the central processing unit 1001, so as to provide an input signal and receive an output signal, which may be the same as the case of a conventional mobile communication terminal.

Based on different communication technologies, a plurality of communication modules 1003 may be arranged in the same computer device, such as a cellular network module, a Bluetooth module and/or a wireless local area network module. The communication module (transmitter/receiver) 1003 is also coupled to a speaker 1009 and a microphone 1010 via the audio processor 1005 to provide an audio output via the speaker 1009 and receive an audio input from the microphone 1010, so as to implement a conventional telecommunication function. The audio processor 1005 may include any proper buffer, decoder, amplifier, etc. Besides, the audio processor 1005 is further coupled to the central processing unit 1001, so as to record sound on a local machine through the microphone 1010 and play the sound stored on the local machine through the speaker 1009.

An embodiment of the present disclosure further provides a computer-readable storage medium, storing a computer program, wherein the computer program, when performed by a processor, implements the above method for controlling redundancy of the valve control system of the converter valve.

An embodiment of the present disclosure further provides a computer program product, including a computer program, wherein the computer program, when performed by a processor, implements the above method for controlling redundancy of the valve control system of the converter valve.

In the embodiments of the present disclosure, the on-duty state and the trigger pulse sent by the valve control main machine and received by the two switch boards are sent to the corresponding FPGAs in the pulse distribution boards; wherein the on-duty state includes the active state and the standby state; the monitoring output channel is arranged between the FPGAs; and the monitoring output channel is configured to transmit running state information of the FPGAs; for each FPGA: in a case that the FPGA receives the on-duty state representing the active state: the high-level control signal is outputted to the data selector through the FPGA; and the optical emitting module is controlled through the FPGA to output the trigger pulse received by the FPGA; in a case that the FPGA receives the on-duty state representing the standby state: the low-level control signal is outputted to the data selector through the FPGA, and the control signal output state of the FPGA and the other FPGA is maintained; the control signal output state is used for representing the type of the control signal outputted by the FPGA; and warning information that the FPGA on-duty state is abnormal and control over the optical emitting module is ineffective is sent in a case that the other FPGA also receives the on-duty state representing the standby state; and in a case that the running state information of the other FPGA received by the FPGA through the monitoring output channel is a crash state: the low-level signal is outputted to the control port of the other FPGA through the monitoring output channel by the FPGA, thus by arranging the monitoring output channel between the dual FPGAs of the pulse distribution boards of the pulse distribution case, not only is an effect of monitoring the control signal is achieved, but also the other FPGA is pulled down when the other FPGA is in a crash state so that the current FPGA outputs the low-level signal, the problem that dual FPGAs of a valve control pulse distribution board in the prior art cannot effectively control the optical emitting module is solved, efficient control over redundancy of the valve control system of the converter valve is implemented, the valve control switching reliability and fault response speed are improved, the system running stability is enhanced, and the problem of unnecessary system halt is avoided.

Those skilled in the art should understand that the embodiments of the present disclosure may be provided as a method, system, or computer program product. Thus, the present disclosure may be in a form of complete hardware embodiment, complete software embodiment or software and hardware combined embodiment. Besides, the present disclosure may adopt a form of a computer program product implemented on one or more computer applicable storage media (including but not limited to a disk memory, CD-ROM, an optical memory and the like) including a computer applicable program code.

The present disclosure is described with reference to flowcharts and/or block diagrams of the method, the device (system), and the computer program product according to the embodiments of the present disclosure. It is to be understood that each flow and/or block in the flowcharts and/or block diagrams as well as a combination of flows and/or blocks in the flowcharts and/or block diagrams may be implemented through computer program instructions. These computer program instructions may be provided for a processor of a general-purpose computer, a special-purpose computer, an embedded processor or another programmable data processing device so as to generate a machine, so that an apparatus for implementing functions specified in one or more flows in the flowcharts and/or one or more blocks in the block diagrams is generated through instructions executed by the processor of the computer or another programmable data processing device.

These computer program instructions may also be stored in a computer-readable memory capable of guiding a computer or another programmable data processing device to work in a specific mode, so that the instructions stored in the computer-readable memory generate a manufacture including an instruction apparatus, and the instruction apparatus implements the functions specified in one or more flows in the flowcharts and/or one or more blocks in the block diagrams.

These computer program instructions may also be loaded to a computer or another programmable data processing device, so that a series of operating steps may be performed on the computer or another programmable device to produce a computer-implemented processing, such that the instructions executed on the computer or the another programmable device provide steps for implementing the functions specified in one or more flows in the flowcharts and/or one or more blocks in the block diagrams.

The above specific embodiments describe the objectives, the technical solutions and the beneficial effects of the present disclosure in further details. It is to be understood that the above description is only specific embodiments of the present disclosure instead of limiting the protection scope of the present disclosure. Any modification, equivalent replacement, improvement and the like made within the spirit and principle of the present disclosure should fall within the protection scope of the present disclosure.

What is claimed is:

1. A method for controlling redundancy of a valve control system of a converter valve, wherein the method is applied to a valve control pulse distribution case in the valve control system of the converter valve; the valve control pulse distribution case comprises two switch boards and pulse distribution boards connected to the two switch boards; each pulse distribution board comprises an FPGA and an optical module connected correspondingly with each switch board; a backplane monitoring channel is further arranged between the two switch boards; the backplane monitoring channel is configured to inter-transmit running state information, between the two switch boards, of the FPGAs connected correspondingly with the two switch boards;

the method comprises:
sending an on-duty state and a trigger pulse sent by a valve control main machine and received by two switch boards to the corresponding FPGAs in the pulse distribution boards; wherein the on-duty state comprises an active state and a standby state; a monitoring output channel is arranged between the FPGAs; the monitoring output channel is configured to transmit running state information of the FPGAs; and the valve control main machine and the switch boards of the valve control pulse distribution case adopt a cross communication, wherein an arm control board in the valve control main machine is in cross connection with the switch boards of the valve control pulse distribution case;

for each FPGA:
in a case that the FPGA receives the on-duty state representing the active state: outputting a high-level control signal to a data selector through the FPGA; and controlling an optical emitting module through the FPGA to output a trigger pulse received by the FPGA;

in a case that the FPGA receives the on-duty state representing the standby state: outputting a low-level control signal to the data selector through the FPGA, and maintaining a control signal output state of the FPGA and the other FPGA; wherein the control signal output state is used for representing a type of a control signal outputted by the FPGA; and sending warning information that the FPGA on-duty state is abnormal and control over the optical emitting module is ineffective in a case that the other FPGA also receives the on-duty state representing the standby state; and in a case that running state information of the other FPGA received by the FPGA through the monitoring output channel is a crash state: outputting a low-level signal to a control port of the other FPGA through the monitoring output channel by the FPGA;

the method further comprises: determining fault grades of different valve control pulse distribution cases; using a valve control pulse distribution case link with a low fault grade as an active case link; using another valve control pulse distribution case link as a standby case link; using a valve control main machine corresponding to the active case link as a target on-duty valve control main machine; sending an on-duty state and a trigger pulse sent by the valve control main machine and received by the two switch boards to the corresponding FPGAs in the pulse distribution boards comprises: sending an on-duty state and a trigger pulse sent by the target on-duty valve control main machine and received by the two switch boards to the corresponding FPGAs in the pulse distribution boards;

wherein the valve control pulse distribution case is connected with an on-duty valve control main machine and a standby valve control main machine; and the method further comprises: receiving an on-duty state and a trigger pulse sent by the standby valve control main machine in a case that the switch boards receive the on-duty state and the trigger pulse sent by the valve control main machine and do not receive an on-duty state and a trigger pulse sent by the on-duty valve control main machine; and sending the on-duty state representing the standby state through the switch boards in a case that the on-duty states and the trigger pulses sent by both the on-duty valve control main machine and the standby valve control main machine are not received.

2. The method according to claim 1, further comprising: connecting monitoring pins of the two FPGAs to form the monitoring output channel; wherein the monitoring output channel is specifically configured to: inter-transmit running state information between the two FPGAs in a case that running state information of the other FPGA received by the FPGA through the monitoring output channel is not a crash state.

3. The method according to claim 1, wherein in a case that the running state information of the other FPGA received by the FPGA through the monitoring output channel is the crash state: outputting the low-level signal to a control port of the other FPGA through the monitoring output channel by the FPGA comprises:
in a case that the running state information of the other FPGA received by the FPGA through the monitoring output channel is the crash state and running state information of the other FPGA received by the switch board connected with the FPGA through the backplane monitoring channel is a crash state: outputting the low-level signal to the control port of the other FPGA through the monitoring output channel by the FPGA.

4. The method according to claim 1, further comprising: determining that the other FPGA receives the on-duty state representing the active state in a case that the FPGA determines through the monitoring output channel that a control signal outputted by the other FPGA to a data selector is a high level, and/or the switch board connected with the FPGA determines through the backplane monitoring channel that a control signal outputted by the other FPGA to the data selector is a high level.

5. The method according to claim 1, further comprising: determining that the other FPGA receives the on-duty state representing the standby state in a case that the FPGA determines through the monitoring output channel that a control signal outputted by the other FPGA to a data selector is a low level, and/or the switch board connected with the FPGA determines through the backplane monitoring channel that a control signal outputted by the other FPGA to the data selector is a low level.

6. The method according to claim 1, further comprising: determining that the running state information of the other FPGA is a crash state in a case that the FPGA cannot determine the control signal output state of the other FPGA through the monitoring output channel, and/or the switch board connected with the FPGA cannot determine the control signal output state of the other FPGA through the backplane monitoring channel.

7. A computer device, comprising a memory, a processor and a computer program stored on the memory and capable of running on the processor, wherein the processor, when performing the computer program, implements the method according to claim 1.

8. A computer-readable storage medium, storing a computer program, wherein the computer program, when performed by a processor, implements the method according to claim 1.

9. A computer program product, comprising a computer program, wherein the computer program, when performed by a processor, implements the method according to claim 1.

10. An apparatus for controlling redundancy of a valve control system of a converter valve, wherein the apparatus is applied to a valve control pulse distribution case in the valve control system of the converter valve; the valve control pulse distribution case comprises two switch boards and pulse distribution boards connected to the two switch boards; each pulse distribution board comprises an FPGA and an optical module connected correspondingly with each switch board; and
the apparatus comprises:
an information sending module, configured to send an on-duty state and a trigger pulse sent by a valve control main machine and received by the two switch boards to the corresponding FPGAs in the pulse distribution boards; wherein the on-duty state comprises an active state and a standby state; a monitoring output channel is arranged between the FPGAs; and the monitoring output channel is configured to transmit running state information of the FPGAs; and
an FPGA controlling module, configured to, for each FPGA:
in a case that the FPGA receives the on-duty state representing the active state: output a high-level control signal to a data selector through the FPGA; and control an optical emitting module through the FPGA to output a trigger pulse received by the FPGA;
in a case that the FPGA receives the on-duty state representing the standby state: output a low-level control signal to the data selector through the FPGA, and maintain a control signal output state of the FPGA and the other FPGA; wherein the control signal output state is used for representing a type of a control signal outputted by the FPGA; and send warning information that the FPGA on-duty state is abnormal and control over the optical emitting module is ineffective in a case that the other FPGA also receives the on-duty state representing the standby state; and
in a case that running state information of the other FPGA received by the FPGA through the monitoring output channel is a crash state: output a low-level signal to a control port of the other FPGA through the monitoring output channel by the FPGA.

* * * * *